United States Patent [19]

Kanda et al.

[11] 4,442,248

[45] Apr. 10, 1984

[54] AQUEOUS COATING COMPOSITIONS

[75] Inventors: Kazunori Kanda, Yao; Shinichi Ishikura, Kyoto, both of Japan

[73] Assignee: Nippon Paint Co., Ltd., Osaka, Japan

[21] Appl. No.: 414,823

[22] Filed: Sep. 3, 1982

[30] Foreign Application Priority Data

Oct. 5, 1981 [JP] Japan .................................. 56-158929

[51] Int. Cl.$^3$ ......................... C08L 63/00; C09D 3/58; C09D 3/66; C09D 3/76

[52] U.S. Cl. ..................................... 523/414; 523/406; 523/408; 523/412; 523/413; 524/35; 524/501; 524/502; 524/507; 524/508; 524/510; 524/512; 524/523; 524/537; 524/538; 524/539; 524/541

[58] Field of Search ................. 524/35, 901, 904, 502, 524/507, 508, 510, 512, 523, 537, 538, 539, 541; 523/501, 414, 406, 408, 412, 413; 204/181 C

[56] References Cited

U.S. PATENT DOCUMENTS

| | | | |
|---|---|---|---|
| 4,165,406 | 8/1979 | Tugukuni et al. | 524/901 |
| 4,174,332 | 11/1979 | Hönig et al. | 523/414 |
| 4,256,805 | 3/1981 | Tugukuni et al. | 524/904 |
| 4,271,277 | 6/1981 | Golownia | 524/904 |
| 4,277,383 | 7/1981 | Hayashi et al. | 524/901 |
| 4,284,759 | 8/1981 | Henbest et al. | 524/904 |
| 4,294,940 | 10/1981 | Hino et al. | 204/181 C |
| 4,335,030 | 6/1982 | Concannon | 524/901 |
| 4,345,948 | 8/1982 | Breuninger | 536/102 |
| 4,358,551 | 11/1982 | Shimp | 204/181 C |
| 4,365,043 | 12/1982 | Konishi et al. | 524/904 |

FOREIGN PATENT DOCUMENTS

| | | | |
|---|---|---|---|
| 2732902 | 8/1978 | Fed. Rep. of Germany | 204/181 C |
| 5271541 | 12/1975 | Japan | 204/181 C |
| 2038336 | 7/1980 | United Kingdom | 524/901 |
| 2050381 | 1/1981 | United Kingdom | 524/901 |

*Primary Examiner*—Ronald W. Griffin
*Attorney, Agent, or Firm*—Wenderoth, Lind & Ponack

[57] ABSTRACT

An aqueous coating composition comprising from 45 to 98 parts by weight (solids) of aqueous resin(s) and from 2 to 55 parts by weight (solids) of finely divided water-insoluble resin(s), in which at least a part of said aqueous resin is selected from amphoteric resins having both carboxyl and amino groups. The resins may have mutually reactive functional groups.

8 Claims, No Drawings

AQUEOUS COATING COMPOSITIONS

FIELD OF INVENTION

The present invention relates to aqueous coating compositions comprising resinous film forming components.

BACKGROUND OF THE INVENTION

Coating compositions comprising organic solvents are dangerous to use, being inflammable and liable to explode, and are physiologically and environmentally harmful. Aqueous coating compositions are therefore, in increasing demand. However, in order to dissolve or disperse a suitable resin in water, it is necessary that the resin should carry a number of hydrophilic groups, to use a neutralizing agent capable of forming a water-soluble salt with the resin, and to use a resin of relatively lower molecular weight. As a result, the performance of films applied using aqueous coating compositions e.g. their durability and water-resistance, tends to be lower than would be desirable. Further, aqueous coating compositions cannot have a high non-volatile content, and their working properties are therefore often unsatisfactory. Again, it is often difficult to disperse colouring matter in aqueous coating compositions, thereby limiting their use, and often excluding fields requiring a high order of finishing appearance, gloss and sharpness, and other properties which are required in, for example the automobile industry.

In general, emulsion coating compositions including a resin prepared by the so-called emulsion polymerisation in an aqueous medium, can include relatively high molecular weight resins. The polymerisation technique must, however, be very carefully controlled. However, the surfactant or emulsifier which is added can reduce the durability and water-resistance of the film which is ultimately obtained.

Powder coating compositions have been suggested as an alternative to coating compositions including an organic solvent, but again problems arise in their use. Blocking may occur if the glass transition point of the resin is too low, giving a coating of poor film properties, and the need to have a high baking temperature and a special applicator limit their field of use.

Coating compositions comprising a powder dispersed in water, as a slurry, are also known. Such compositions cannot have a high non-volatile content, making it difficult to obtain a thick coating and/or satisfactory film adhesion (which can lead to cracks in the film). Dispersed powder coating compositions are difficult to apply by spraying, and tend to have low gloss. The slurried powder tends to separate out during storage and, since a dispersing agent is usually present, the water-resistance of the films obtained is often low. Slurry compositions have not generally been used in practice. Many attempts have been made to overcome the problems associated with aqueous dispersion type coating compositions. In particular, a water-soluble or water-dispersible resin have been added; for example, Japanese Patent Applications Nos. 127151/74, 25224/76 and 31636/76 disclose compositions comprising a water-insoluble, dispersed resin as the main ingredient, with a minor amount of a water-soluble or water-dispersible resin. Japanese Patent Applications Nos. 74606/79 and 170262/79 disclose coating compositions comprising a pulverised coating resin and a carboxyl group-bearing water soluble resin in a weight ratio, as solids, of from 0.1 to 100:1; in the specific examples, however, the content of water-soluble resin is about 10 to 20% of the powdered resin and is thus no more than a dispersion stabilizer in a dispersion system. The same is true with respect to the disclosure of Japanese Patent Publication No. 4149/80, of an aqueous dispersion coating composition comprising at least two water-insoluble resinous powders and one or more water-soluble resins.

In using an aqueous dispersion coating medium, the dispersion stability of the powder is always a problem. Various attempts have therefore been made to use finely pulverised resins or dispersion aids. However, since the known systems have been developed on the assumption that, if the powder is surrounded by a water-soluble resin, dispersion stability is improved owing to the affinity of the water-soluble resin to the aqueous medium, it is not surprising that the known compositions comprise only a low content of the water-soluble resin with respect to the dispersed resin.

SUMMARY OF THE INVENTION

An object of the invention is, therefore, to provide an aqueous coating composition being free of the drawbacks of heretofore known aqueous dispersion type coating compositions. Another object is to provide an aqueous coating composition with a good dispersion stability and capable of forming an excellent film with higher gloss. Other objects will be apparent from the descriptions of the specification and appended claims.

These and other objects of the invention can be attained with the present aqueous coating composition which comprises from 45 to 98 parts by weight (solids) of aqueous resin(s) and from 2 to 55 parts by weight (solids) of finely divided water insoluble resin(s), in which at least a part of said aqueous resin(s) is selected from amphoteric resins having from 0.2 to 4 m mol/g of carboxyl groups and from 0.01 to 3 m mol/g of amino groups.

DESCRIPTION OF THE PREFERRED EMBODIMENTS

The invention is based on the discovery that, by using certain type of water-soluble or water-dispersible resins (hereinafter called as aqueous resins), the content of water-insoluble resin in an aqueous coating composition can be increased without causing the increase in viscosity of the composition, and that the thus obtained composition is stable, even in the absence of surfactant or dispersing agent because of the particular rheorogical properties thereof. On storage and in use, therefore, a composition of the invention can avoid sedimentation and separation of solid matter, and resin coagulation, thereby allowing the production of a good quality, thick coating which, on curing, can give a film having good durability, chemical resistance and other desired properties. Dispersion of colouring matter in the present coating composition is also very excellent. An aqueous coating composition of the present invention comprises finely-divided water-insoluble resin dispersed in an aqueous/resin system and should not be confused with the known type of composition comprising water and a powdered resin to which a water soluble resin has been added, as a modifier.

The aqueous resins used in the present composition are amphoteric resins having both carboxyl groups and amino groups. Examples of such aqueous resins are, in the polymerization type polymers, vinyl resins obtained by the copolymerization of carboxyl bearing monomers and amino bearing monomers. More specifically, the carboxyl bearing monomers are α,β-unsaturated carboxylic acids as, for example, acrylic acid, methacrylic acid, cinnamic acid, crotonic acid, fumaric acid, citraconic acid, maleic anhydride and itaconic acid, and the amino bearing monomers are acrylic or methacrylic esters (e.g. aminomethyl ester, 2-aminoethyl ester, dimethylaminoethyl ester, diethyl aminomethyl ester, dimethylaminoethyl ester, diethylaminoethyl ester, 2-(dimethylamino)ethyl ester, 2-(diethylamino)ethyl ester, 4-piperidyl ester, 4-anilinophenyl ester, 2-(1-aziridinyl)ethyl ester); acrylamide or methacrylamide derivatives (e.g. N-(dimethylaminomethyl)(meth)acrylamide, N-(dimethylaminoethyl)(meth)acrylamide).

Other monomers optionally used in the preparation of said resins are acrylic or methacrylic esters (e.g. methyl ester, ethyl ester, n-propyl ester, isopropyl ester, n-butyl ester, isobutyl ester, t-butyl ester, 2-ethyl hexyl ester, n-octyl ester, lauryl ester, stearyl ester, tridecyl ester, glycidyl ester, 2-butoxy ethyl ester, 2-hydroxy ethyl ester, 2-hydroxy propyl ester, 3-hydroxy propyl ester, 4-hydroxy propyl ester); acrylamide, methacrylamide and derivatives thereof (e.g. N-methyl(meth)acrylamide, N-ethyl-(meth)acrylamide, N-propyl-(meth)acrylamide, N-butyl-(meth)acrylamide, N,N-dimethyl-(meth)acrylamide, N,N-diethyl-(meth)acrylamide, N,N-dipropyl-(meth)acrylamide, N-hydroxymethyl-(meth)acrylamide, N-hydroxyethyl-(meth)acrylamide,); acrylonitrile, styrene and derivatives thereof (e.g. α-, o-, m-, or p-methylstyrene, p-t-butylstyrene), vinyl toluene, dimethyl itaconate and the like.

The amphoteric aqueous resins may also be of the condensation type produced by the reaction of polybasic acids and polyhydric alcohols. The amino groups can be provided by using such amino bearing monomers as alkanolamines (e.g. monoethanol amine, diethanol amine, triethanol amine, monoisopropanol amine, diisopropanol amine, dimethyl ethanol amine, diethyl ethanol amine, isopropyl ethanol amine, 2-amino-2-methyl propanol amine, 2-(dimethylamino)-2-methyl propanol); and amino acids (e.g. glycine, α-alanine, β-alanine, α-aminobutyric acid, β-aminobutyric acid, γ-aminobutyric acid, valine, δ-amino valeric acid, leucine, isoleucine, ε-amino-caproic acid, asparagic acid, glutamic acid, lysine). In the polycondensation reaction, a higher temperature (at around 200° C.) will often cause amidation and hence, it is preferred to carry out the reaction at a comparatively lower temperature (about 150° C.) or to use monomer having tertiary amine as, for example, triethanol amine, dimethyl ethanol amine, diethyl ethanol amine, and 2-(dimethylamino)-2-methyl propanol. It is also possible to use, in the preparation of said amphoteric aqueous resins, epoxy resins, natural oils and fatty acids.

In such an amphoteric aqueous resin, it is desirous to have 0.2 to 4 m mol/g, preferably 0.3 to 3 m mol/g, of carboxyl groups and 0.01 to 3 m mol/g, preferably 0.05 to 2 m mol/g, of amino groups. When the amounts of said functional groups are too small, it is impossible to attain the desired dispersibility, gloss and other properties, and when it is too excessive, such will cause decrease in water resistance and discoloration of the ultimate coating.

The above-said amphoteric aqueous resins may further include such reactive groups as sulfonic acid, phosphoric acid, hydroxy, oxirane, active methylol, reactive carbon-carbon unsaturation, isocyanate, blocked isocyanate and halogen. For the introduction of such groups, any of the known techniques as, for example, selection of monomer, control of polymerization, may be satisfactorily used.

In order to obtain an aqueous resin varnish, this amphoteric resin may be treated with a basic substance (e.g. monomethyl amine, dimethyl amine, trimethyl amine, monoethyl amine, diethyl amine, triethyl amine, monoisopropyl amine, diisopropyl amine, diethylene triamine, triethylene tetramine, monoethanol amine, diethanol amine, triethanol amine, monoisopropanol amine, diisopropanol amine, dimethyl ethanol amine, morpholine, methyl morpholine, piperazine, ammonia, sodium hydroxide, potassium hydroxide, and lithium hydroxide) or with an acid (e.g. organic acids as formic acid, acetic acid, hydroxy acetic acid, propionic acid, butyric acid, lactic acid, valeric acid, caproic acid, enanthylic acid, caprylic acid, pelargonic acid, capric acid, lauric acid, myristic acid, palmitic acid and stearic acid; and inorganic acids as phosphoric acid, sulfuric acid and hydrochloric acid) to effect the neutralization thereof.

In this invention, thus obtained aqueous resin varnish can be used as the whole or a part of the aqueous resin varnish component of the coating composition. In the latter case, any of the conventional aqueous resins as alkyd resin, amino resin, phenol resin and acrylic resin may be satisfactorily used. However, for the purpose of improvements in the dispersibility of the water-insoluble resinous fine powders and the gloss of coating, the amphoteric aqueous resin should preferably be more than 30% by weight of the total resins in the aqueous varnish employed.

In the present invention, finely divided water-insoluble resin is used with the above mentioned aqueous resin varnish. Examples of such resins are acrylic, polyester, alkyd, epoxy, urethane, amino, phenol, polyolefin, vinyl, cellulose, polyalkadiene, polyamide, polycarbonate and fluorine resins. One or more water-insoluble resins may be used in the present composition. In addition to the water-insolubility, such resins should be solid at ambient temperatures and, when heated, compatible with other resins in the composition. Preferably, such resins should have a glass transition point (Tg) of more than 40° C. If Tg is less than 40° C., there often cause difficulties in the preparation of the coating composition and decrease in the storage stability thereof.

The particle size of the water-insoluble resin is not critical but is, in general, from 0.1 to 100μ, preferably 0.2 to 70μ. There is a tendency that when the particle size exceeds over 100μ, the mechanical properties will decrease and when it is less than 0.1μ, viscosity of the composition becomes high.

Regarding the reactivity of such resin, there is no particular limit on it. The water-insoluble resin may or may not carry functional groups capable of reacting, when heated, with those of other resins. Such functional groups may be carboxyl, hydroxyl, active methylol, oxirane, isocyanate, blocked isocyanate, amino groups and reactive carbon-carbon bond. Since the presence or absence of functional groups is not critical, it may be understood that the resin composition of the invention may be thermoplastic or thermosetting.

Fine powders of such resins can be prepared according to conventional techniques and methods. For example, apparatus and technique for the preparation of powder coating may be used as they are. At this time, colouring matter and other additives (modifier, dispersing aids, regulator and the like) may be added if desired.

A composition of the present invention comprises from 45 to 98, preferably 50 to 90, parts by weight of the aqueous resin(s) and from 2 to 55, preferably 10 to 50, parts by weight of water-insoluble resin(s). These amounts are calculated in terms of the solid content. When the weight ratio of resins is outside the given range, it is difficult or even impossible to obtain a stable composition with optimum rheological properties. For example, if the content of aqueous resin is too low, the dispersion stability of the water-insoluble resin is too poor, with resultant damage on levelling the coated film; if the amount of aqueous resin is too high, the viscosity of the composition becomes too high and hence, it is inevitable to decrease the solid content, which will cause operational difficulties because of the occurence of pinholes and sagging. The present coating composition, thus, comprises as film-forming components the above said amphoteric aqueous resin(s) and water-insoluble resin(s), and aqueous medium. Cross-linking may optionally be produced between the aqueous resins, between the water-insoluble resins, or between the aqueous resin and the water-insoluble resin by means of the functional groups already stated or by making use of other cross-linking agent as blocked polyisocyate, epoxy resin and amino resin.

The composition may comprise, in addition to the aqueous medium, a small quantity of hydrophilic polar organic solvent, if desired. Examples of such organic solvents are ethylene glycol monomethyl ether, ethylene glycol monoethyl ether, ethylene glycol monobutyl ether, methanol, ethanol, isopropanol, n-butanol, sec-butanol, t-butanol, and dimethyl formamide. In addition, the coating composition may comprise colouring matter and other additives (e.g. modifier, dispersing aids, surface conditioning agent and the like) if desired. The coating composition of this invention can be prepared in any conventional ways. For example, in the preparation of a colored coating composition, coloring matter is first added with a portion of the aqueous resin varnish to make a colour paste, to which are added the remaining proportion of the aqueous resin varnish, fine powders of water-insoluble resin and any other additives, and the whole is stirred well by using a known mixing device. Thus obtained coating composition may be applied, with or without dilution with water, by a conventional coating technique. All of the drawbacks possessed by the conventional aqueous coating and powder coating are ingeniously overcome, and excellent working properties, dispersion stabilities and desirous film performances unable to be realized by the conventional slurry coating can be attained with the present coating composition.

The following Examples illustrate the invention, by comparison with Comparative Examples. Unless otherwise stated, all parts are by weight.

EXAMPLE 1

Into a 450 ml vessel, were placed 140 parts of the aqueous resin varnish No. 1 shown in Table 1, 95 parts of deionized water, 58 parts of Rutile type titanium dioxide and 45 parts of the resinous fine powder No. 1 shown in Table 2, and the mixture was stirred well by using paint conditioner for 1 hour to obtain a white coloured aqueous coating paste. 150 Parts of thus obtained paste were mixed, by using mixer, with 5 parts of amino resin (Sumimal M 50W, manufactured by Sumitomo Chem. Co.) to obtain a white coloured coating composition. This composition was applied onto a polished steel plate so as to give $35\mu$ dry thickness, and dried at 150° C. for 20 minutes to obtain a white coloured coating with smooth surface. The gloss (60° gloss value) of this coating was 56 and the minimum film thickness giving no pinholes was $51\mu$ and the minimum film thickness giving no sagging was $59\mu$.

TABLE 1

| varnish No. | Resin | characteristics of resin | | | characteristics of varnish | |
|---|---|---|---|---|---|---|
| | | acid value | amine value | $\overline{Mn}^1$ | non-volatile wt % | neutralization[2] % |
| 1 | acrylic resin | 80 | 10 | 3000 | 40 | 60 |
| 2 | ibid | 35 | 35 | 6000 | 33 | 100 |
| 3 | ibid | 55 | 20 | 6000 | 40 | 100 |
| 4 | ibid | 25 | 10 | 4500 | 40 | 100 |
| 5 | ibid | 56 | 50 | 4500 | 33 | 80 |
| 6 | alkyd resin | 50 | 5 | 2000 | 40 | 100 |
| 7 | acrylic resin | 55 | 0 | 5000 | 33 | 100 |
| 8 | alkyd resin | 45 | 0 | 1500 | 40 | 100 |

[1] number - average molecular weight by GPC
[2] neutralization % of carboxyl in the resin with dimethyl ethaonl amine

TABLE 2

| Powder No. | Resin | characteristics of resin | | | | | average particle size ($\mu$) |
|---|---|---|---|---|---|---|---|
| | | acid value | hydroxy value | epoxy equivalent | $\overline{Mn}$ | Tg (°C.) | |
| 1 | polyester resin | 9 | 31 | — | 4000 | 62 | <100 |
| 2 | polyester resin | 55 | 0 | — | 3500 | 67 | <100 |
| 3 | acrylic resin | 77 | 20 | — | 5500 | 70 | <100 |
| 4 | acrylic resin | 12 | 40 | — | 5000 | 64 | <100 |
| 5 | epoxy resin | 0 | 120 | 920 | 1400 | 99 | <100 |

EXAMPLES 2 TO 6

Various coatings were prepared according to the method of Example 1, but using the materials shown in Table 3. The film performances obtained are shown in Table 4.

TABLE 3

(parts by weight)

| Example No. | aqueous resin varnish | | deionized water | TiO$_2$ | resinous fine powder | | amino resin Suminal M50W |
|---|---|---|---|---|---|---|---|
| | No. | amount | | | No. | amount | |
| 2 | 2 | 90 | 100 | 40 | 2 | 70 | 3 |
| 3 | 3 | 150 | 90 | 60 | 3 | 40 | 6 |
| 4 | 4 | 225 | 50 | 55 | 5 | 10 | 9 |
| 5 | 5 | 120 | 95 | 55 | 4 | 60 | 4 |
| 6 | 6 | 175 | 60 | 55 | 2 | 30 | 6 |

TABLE 4

| Example No. | gloss (60° gloss) | film thickness giving no pinholes | film thickness giving no sagging |
|---|---|---|---|
| 2 | 63 | | |
| 3 | 91 | | |
| 4 | 90 | | |
| 5 | 82 | | |
| 6 | 88 | | |

COMPARATIVE EXAMPLE 1

A white coloured coating was obtained according to the method of Example 1, but using in place of aqueous resin varnish No. 1, 170 parts of aqueous resin varnish No. 7. The gloss (60° gloss) of this coating was 32.

EXAMPLE 7

Into a 450 ml vessel, were placed 95 parts of aqueous resin varnish No. 3, 95 parts of deionized wateer and 35 parts of resinous fine powder No. 3, and the mixture was stirred well by using a paint conditioner for 1 hour. Average grain diameter of the resinous powders in the obtained composition was 7μ, measured by using centrifugal type, automatic, particle size distribution measuring apparatus CAPA-500, manufactured by Horiba Seisakusho.

COMPARATIVE EXAMPLE 2

Similar composition as stated in Example 7 was prepared, using aqueous resin varnish No. 8 in place of aqueous resin varnish No. 3. The mean grain diameter was 38μ.

We claim:

1. An aqueous coating composition comprising from 45 to 98 parts by weight as solids of at least one aqueous resin and from 2 to 55 parts by weight as solids of at least one finely divided water-insoluble resin, in which at least a part of said aqueous resin is selected from amphoteric resins having 0.2 to 4 m mol/g carboxyl groups and 0.01 to 3 m mol/g amino groups.

2. A composition according to claim 1, which comprises at least two resins having functional groups which are mutually reactive at an elevated temperature.

3. A composition according to claim 1, wherein the amphoteric resin is selected from acrylic resin and alkyd resin.

4. A composition according to claim 1, wherein the water-insoluble resin is selected from epoxy, polyester, alkyd, phenol, urethane, amino, vinyl, cellulose, polyamide, and polycarbonate resins.

5. A composition according to claim 1, wherein the mean diameter of the particles of the finely divided water-insoluble resin is from 0.1 to 100μ.

6. A composition according to claim 1, wherein the water-insoluble resin has a glass transition point of more than 40° C.

7. A composition according to claim 1 which comprises from 50 to 90 parts by weight as solid of at least one aqueous resin and from 10 to 50 parts by weight as solids of at least one water-insoluble resin.

8. A composition according to claim 1, which additionally comprises a polar organic solvent.

* * * * *